United States Patent
Moya

(10) Patent No.: US 7,097,766 B2
(45) Date of Patent: Aug. 29, 2006

(54) SAND FILTER WITH ROTATING VANES

(75) Inventor: Emmanuel G. Moya, Corona, CA (US)

(73) Assignee: Griswold Controls, Irvine, CA (US)

( * ) Notice: Subject to any disclaimer, the term of this patent is extended or adjusted under 35 U.S.C. 154(b) by 0 days.

(21) Appl. No.: 10/449,927

(22) Filed: May 30, 2003

(65) Prior Publication Data

US 2004/0238430 A1   Dec. 2, 2004

(51) Int. Cl.
B01D 24/46   (2006.01)
(52) U.S. Cl. .................. 210/272; 210/280; 210/289
(58) Field of Classification Search ............ 210/271, 210/272, 276, 286, 289, 291, 280
See application file for complete search history.

(56) References Cited

U.S. PATENT DOCUMENTS

| | | | | |
|---|---|---|---|---|
| 293,747 | A * | 2/1884 | Hyatt | 210/796 |
| 554,312 | A * | 2/1896 | Robinson | 210/272 |
| 3,189,181 | A * | 6/1965 | Couse | 210/291 |
| 3,292,788 | A * | 12/1966 | Schwartz | 210/796 |
| 4,139,473 | A | 2/1979 | Alldredge | 210/279 |
| 4,411,779 | A | 10/1983 | McConnell, III | 210/108 |
| 4,673,500 | A | 6/1987 | Hoofnagle et al. | 210/307 |
| 4,842,744 | A | 6/1989 | Schade | 210/636 |
| 4,900,434 | A | 2/1990 | Schade | 210/189 |
| 5,112,483 | A | 5/1992 | Cluff | 210/223 |
| 5,505,847 | A | 4/1996 | Yamada et al. | 210/169 |
| 5,779,996 | A | 7/1998 | Stormo | 422/227 |
| 6,287,462 | B1 | 9/2001 | Likos | 210/169 |

OTHER PUBLICATIONS

Information from website re Industrial In-line Multi-Media Filtration System; 2 pgs; Aug. 21, 2001.

Information from website re Industrial Granular Activated Carbon Filtration Systems; 1 pg; Aug. 29, 2001.

Information from website re SMF-FG Filter System; 2 pgs; date unknown.

Information from website re Continuous Downflow Sand Filter; 2 pgs; date unknown.

Information from website re Industrial Process Water Filtration; 2 pgs; Oct. 26, 2001.

Information from website re High Rate Sand Media Filters; 1 pg; Sep. 6, 2001.

Information from website re Industrial In-line Deep Bed Sand Media Filtration Systems; 1 pg; Aug. 29, 2001.

* cited by examiner

Primary Examiner—Ivars C. Cintins
(74) Attorney, Agent, or Firm—Mark D. Miller

(57) ABSTRACT

The present invention is a media-based fluid filtration system that extends the time between backwashing operations and prevents the agglomeration of filtered particles at the top of the media bed through the use of a plurality of rotating vanes and associated tines that continuously agitate the upper portion of the filtration media to create a fluidized bed. The fluid stream to be filtered is introduced at the top of a generally cylindrical filtration chamber at a tangential angle to induce a helical flow inside the chamber. The chamber contains one or more layers of filtering media such as sand, gravel, or the like below the inlet. The incoming fluid stream makes contact with a plurality of pivotally mounted vanes, causing them to rotate. One or more downwardly extending tines are attached to each blade, extending down from the blade into the top layer of the filtering media. The pressure from the incoming fluid rotates the blades, causing the tines to stir the top layer of the media which prevents filtered particles from agglomerating or caking at the top of the media.

9 Claims, 3 Drawing Sheets

SAND FILTER WITH ROTATING VANES

BACKGROUND OF THE INVENTION

1. Field of the Invention

The present invention relates to media-based solid-liquid filters, and more particularly to a new and improved sand media filtering device for efficiently and continuously filtering solids from liquids in a liquid/solid mixture for longer periods of time with fewer backwashing operations.

2. Description of the Prior Art

Many agricultural, industrial, and commercial processes and systems require filtration of the water or other fluids used. The ultimate purpose or use for the water or fluid generally dictates the amount of filtration required. For some operations, filtration of particles down to 20 microns is sufficient, while others may require filtration down to 5 microns, 1 micron or even less. To address these needs, different filtration systems have been developed.

Screen or wire mesh filters are well known in the art. Such filters typically employ one or more layers of woven wire screen or mesh, sometimes having different opening sizes. Water or fluid is passed through the mesh which filters out particles larger than the smallest opening sizes of the mesh. Because of their permanent fixation, such filters can become easily and quickly clogged, and therefore require constant cleaning or backwashing. This kind of constant interruption of the filtration process cannot be tolerated in many environments.

Media-based filters have also been developed which include one or more layers of different sized media (such as sand or gravel) deployed in a filtration chamber. Water or fluid is passed through the chamber, and the media filters out particles. The media may range in size from coarse to fine, depending upon the amount of filtration required, and may include activated carbon to remove organic materials such as bacteria and the like. Filtered particles accumulate in the media and must eventually be removed by backwashing.

For many media-based filters, it is common to backwash three or four times per day. This causes a disruption in the filtering process, and often requires use of filtered water or fluid to perform the backwashing operation itself. It is possible to lengthen the time between backwashing operations by providing larger filters with more media, however large filters may not be appropriate or affordable in many applications. Unfortunately, media-based filtration systems also suffer from a significant drawback posed by the potential for agglomeration or caking of filtered particles at the top of the media bed, forming a solid layer. When such caking occurs, it may slow or stop the filtration process until the caked material can be backwashed out. More significantly, if the caked material becomes too thick, it may also interrupt or prevent the backwashing process itself.

It is therefore desirable to provide a media-based fluid filtration system that is capable of providing filtration for longer periods of time between backwashes without increasing the size of the system, and which prevents the agglomeration of filtered particles at the top of the media bed.

SUMMARY OF THE INVENTION

The present invention provides a media-based fluid filtration system that extends the time between backwashing operations and prevents the agglomeration of filtered particles at the top of the media bed through the use of a filtration device that includes a plurality of rotating vanes and associated tines that continuously agitate the upper portion of the filtration media to create a fluidized bed. In the present invention, the fluid stream to be filtered is introduced at the top of a generally cylindrical filtration chamber at a tangential angle to induce a helical flow inside the chamber. The chamber contains one or more layers of filtering media such as sand, gravel, garnet, activated carbon, or the like below the inlet. The incoming fluid stream makes contact with a plurality of pivotally mounted blades or vanes, causing them to rotate. One or more downwardly extending tines are attached to each blade, extending down from the blade into the top layer of the filtering media. The pressure from the incoming fluid rotates the blades, causing the tines to stir the top layer of the media where agglomeration or caking is most likely to occur. This agitation prevents filtered particles from agglomerating or caking at the top of the media.

It is preferred that the incoming fluid stream be balanced with respect to the media so that consistent filtration is performed. In this regard, the incoming fluid stream is preferably introduced through a pair of oppositely positioned inlets, multiple pairs of inlets, or through a plurality of inlets that are positioned to achieve a balanced inflow.

The lengths of the tines are such that they penetrate into the top layer of the filtration media. Although the tines may all be of the same length, this is not necessary, and in many cases better agitation can be achieved through the use of tines having several different lengths so as to stir the media at different depths.

Depending upon the amount of filtration desired, a single or multiple layers of filtration media may be provided, ranging from very fine to very coarse, and anything in between. Different media material may also be used including without limitation sand, gravel, garnet and the like. If control of organic materials is desired, activated carbon may also be included with or in place of other media.

The fluid is removed from the present invention through a plurality of filtration nozzles located at the bottom of the vessel. These nozzles are attached to a plurality of hollow removal arms that communicate with the outside of the vessel. Each nozzle is covered by a wire mesh filter screen, generally having opening sizes of 10 microns. While nozzle screens having different sized openings may be substituted to accomplish different levels of filtration, this is more likely to be accomplished by substituting different media in the vessel itself. The nozzles and arms are preferably positioned such that they are surrounded by the lowermost layer of the filtration media. In an alternative embodiment, the nozzles may be deployed below the lowermost layer, separated therefrom by use of a screen or other media support.

Because of the constant agitation of the upper media into a fluidized bed, the filtration system of the present invention avoids agglomeration of particles, and is capable of performing filtration operations for longer periods of time between backwash operations. Comparable filtration systems may require backwashing three or four times daily, while the filtration system of the present invention may only require backwashing once per day. Moreover, the backwashing operation itself is made faster and more efficient with the present invention because there is no layer of agglomerated particles to be broken up or dislodged during the backwashing operation.

It is therefore a primary object of the present invention to provide a media-based filtration system having a fluidized upper media bed that prevents the agglomeration of filtered particles.

It is also an important object of the present invention to provide a media-based filtration system that is capable of performing filtration operations for extended periods of time between backwash operations because filtered particles do not agglomerate in the media bed.

It is a further important object of the present invention to provide a media-based filtration system having a fast and efficient backwash operation that is not impaired by any agglomeration of filtered particles.

It is a further important object of the present invention to provide a media-based filtration system having a plurality of rotatable blades above the media bed, with each blade attached to one or more tines that extend into the media bed, such that the tangential inflow of fluid into the system rotates the blades causing the tines to agitate the upper layer of the media bed.

Additional objects of the invention will be apparent from the detailed descriptions and the claims herein.

DETAILED DESCRIPTION

Figure 1:
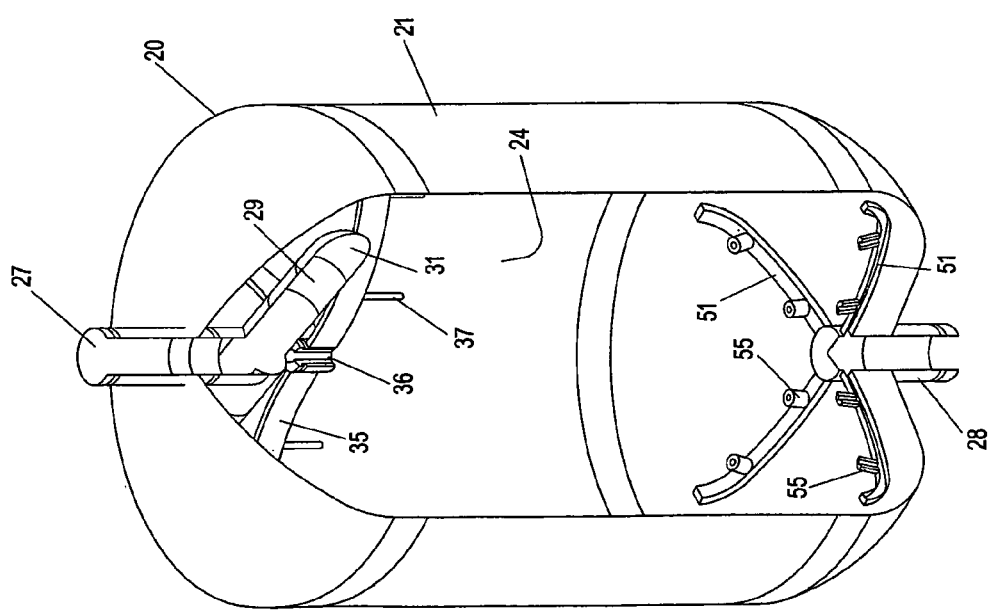
FIG. 1 is a front perspective view of one embodiment of the present invention.

Referring to the drawings wherein like reference characters designate like or corresponding parts throughout the several views, and referring particularly to FIG. 1, it is seen that the invention includes a large vessel 20 having a cylindrical wall 21 defining an internal chamber 24. A central axially aligned upper inlet pipe 27 is provided at the top of vessel 20 for the normal operation of receiving an incoming fluid stream containing liquid, solids and gasses ("fluid stream"). A central, axially aligned lower outlet pipe 28 is provided at the bottom of vessel 21 leading from internal chamber 24 to the exterior for the normal discharge of filtered fluid. It is to be appreciated that during periodic backwash or backflow operations, fluid is introduced at lower pipe 28 and exits at upper pipe 27.

Figure 5:
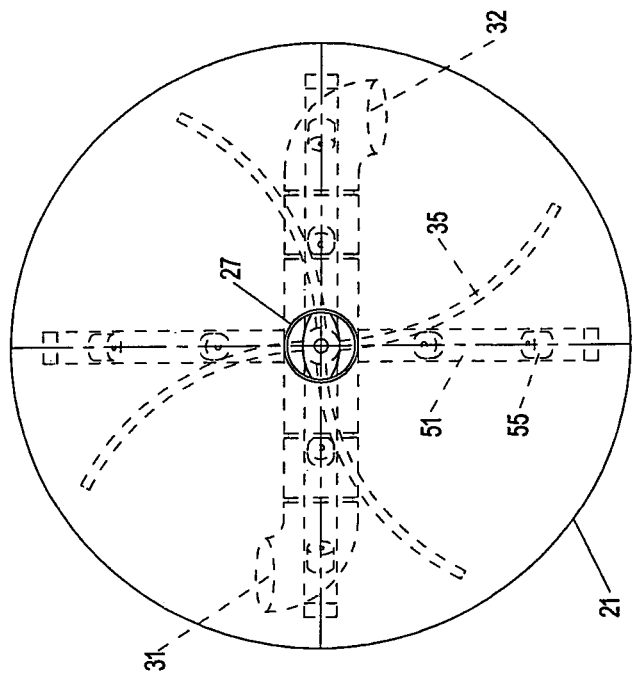
FIG. 5 is a top plan view of the present invention showing the internal structures in phantom lines.
Figure 4:
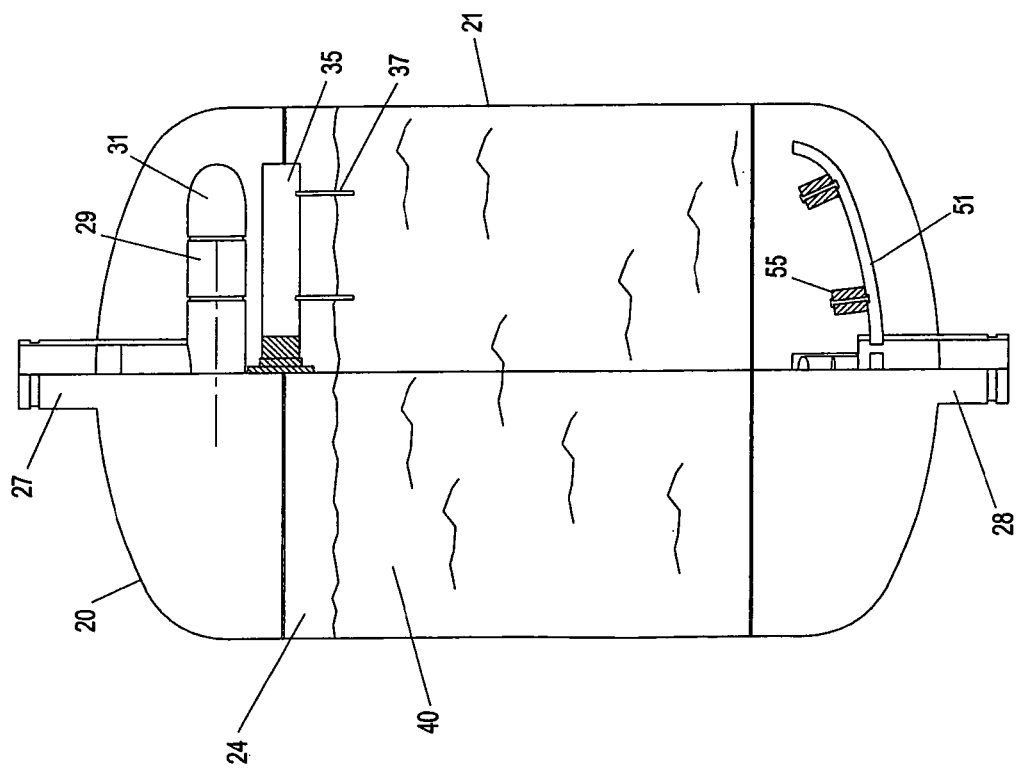
FIG. 4 is a partially cut-away side plan view of the present invention.
Figure 6:
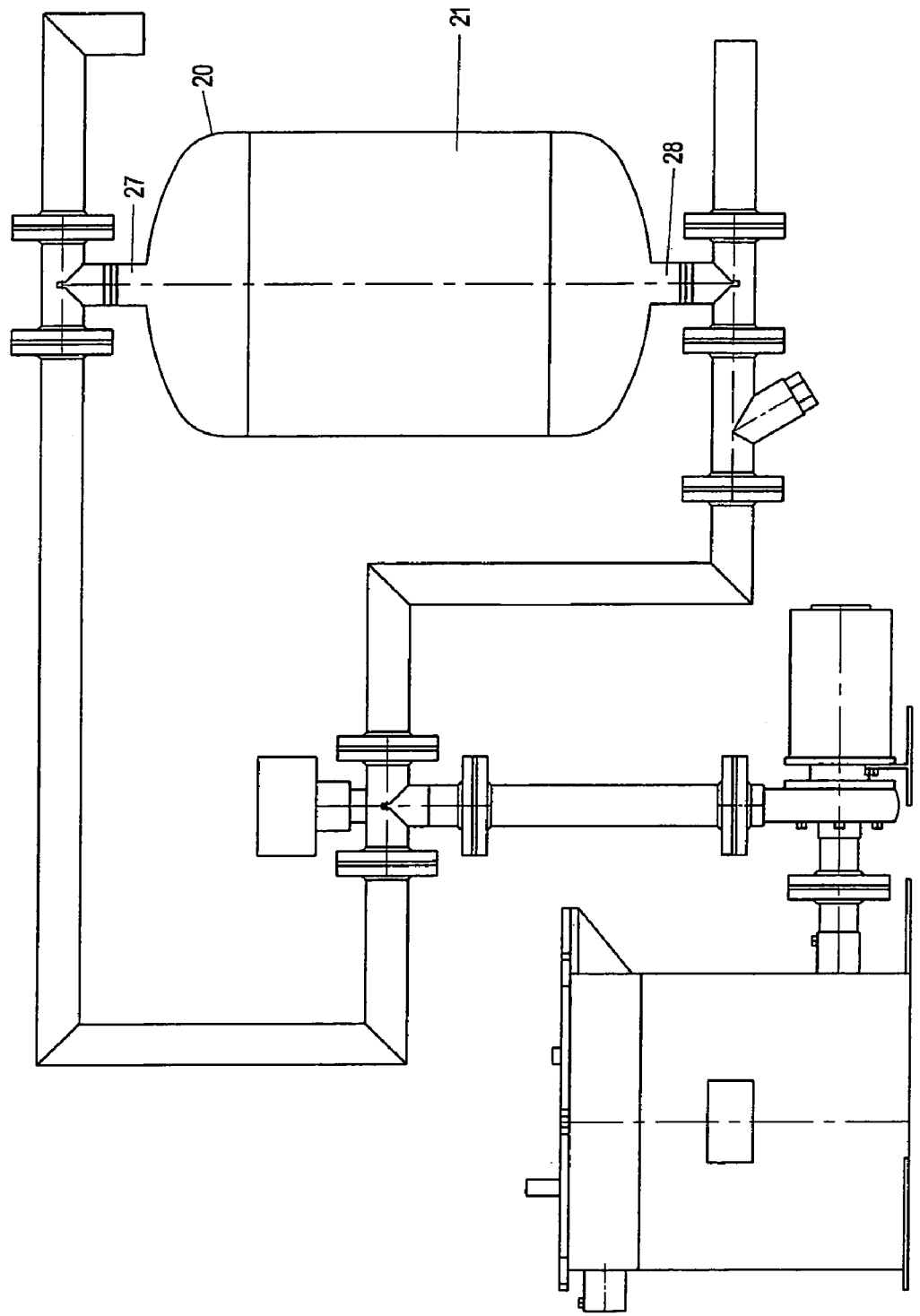
FIG. 6 is an environmental view showing the invention installed as part of a fluid filtering system.

Inlet pipe 27 extends into chamber 24 and connects perpendicularly into a lateral pipe 29 forming a coupling in the shape of an inverted "T." The two arms of lateral pipe 29 extend outwardly and terminate in chamber 24 near cylindrical wall 21. The ends 31, 32 of both arms are open, allowing fluid to pass from inlet pipe 27 through lateral pipe 29 and into chamber 24. Elbow or corner pipes are provided on each end 31, 32 of lateral pipe 29 so that fluid entering chamber 24 through pipe 29 does so at an angle that is generally tangential to cylindrical wall 21. See FIG. 5. In addition, each end opening 31, 32 of pipe 29 is tilted slightly downwardly. This tangential, downward introduction of fluid results in a downward rotational flow inside chamber 24, creating a slight vortex in chamber 24.

A balanced incoming fluid flow is desirable so that uniform filtration can occur. This is accomplished by the pair of oppositely positioned inlet openings 31, 32. It is to be appreciated that any other configuration of inlet openings that provide a balanced incoming fluid flow may alternatively be used, including multiple pairs of oppositely positioned openings, or any other suitable arrangement of openings.

Figure 2:
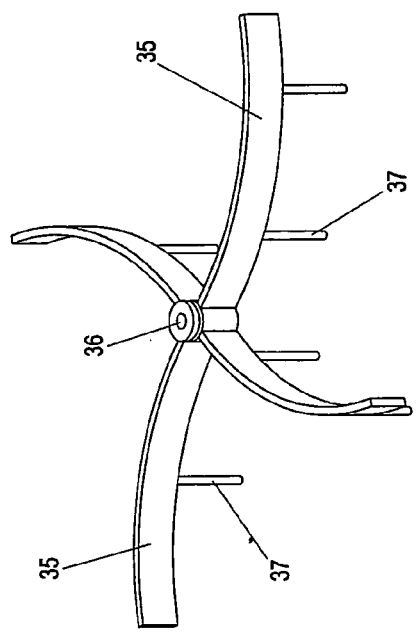
FIG. 2 is a detailed perspective view of the rotating blades of the present invention.

Referring to FIGS. 1 and 2, it is seen that a plurality of slightly arcuate blades (impellers) or vanes 35 are provided immediately below outlets 31 and 32 of pipe 29. One end of each of blades 35 is attached to an axially aligned central pivot 36. Each blade 35 extends generally radially outwardly away from pivot 36, with the opposite end of each blade 35 terminating near cylindrical wall 21. Blades 35 are positioned so that the downward, tangential flow entering chamber 24 through outlets 31 and 32 makes contact with them. This contact causes blades 35 to rotate about pivot 36 in a circular motion. It is to be appreciated that blades 35 have a generally flat cross section, and may be straight, but are preferably slightly arcuate in order to respond more fully to the incoming flow. The amount of curvature of vanes 35 may range from none to substantial, depending upon the anticipated solids/liquid content of the incoming fluid stream.

Each of blades 35 is provided with one or more downwardly extending rods or tines 37 that move in a circular path in accordance with the rotation of each blade. Tines 37 are preferably placed at different distances from the ends of the various blades 35 so that a different circular path is defined by each of tines 37. When blades 35 are in motion, tines 37 rake the top of the media bed 40 inside chamber 24 so as to prevent caking or the formation of a blanket from the agglomeration or solidification of particulates (particularly organic materials) on the top of the filter bed. A media bed 40 made up of sand or garnet (depending upon the level of filtering desired) is provided in chamber 24, which causes filtering through one or more levels of filtration media which may be provided in varying depths of thickness. It is to be appreciated that the exact grade, depth and type of media selected may be varied widely depending upon the ultimate filtration goal to be achieved. A typical exemplary media bed might include ¾" pea gravel at the bottom, garnet in the middle, and sand (feldspar #120) at the top. Variations might include providing activated carbon in place of or in addition to the garnet in the middle to control bacteria. The grade 120 feldspar might be expected to provide filtration down to 10 microns, but if greater filtration is desired, it might be replaced with a higher grade feldspar (100, 80 or higher) to achieve filtration down to 5 or even 1 micron.

Figure 3:
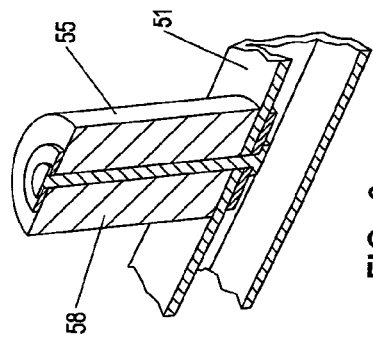
FIG. 3 is a detailed sectional perspective view of a discharge nozzle.

The fluid stream passes through the media 40, and enters the lower region of vessel 24. Here the filtered fluid exits vessel 20 through a plurality of wedge-wire screens. As shown in FIGS. 1 and 3, a plurality of hollow arms 51 are provided in the lower section of chamber 24, each arm being in fluid communication with exit pipe 28. Arms 51 are positioned above the floor of vessel 20 so as not to become buried in settling sediment, but are designed to be surrounded by media (e.g., coarse ¾" pea gravel). One or more removal nozzles 55 are provided on each of arms 51, and each removal nozzle includes a wedge-wire screen 58 having micronic openings. See FIG. 3. Different screens having different sized openings may be utilized with nozzles 55 depending upon the level of filtration desired, although changes in filtration are ordinarily accomplished by using different media.

The raking action of the tines 37 caused by the rotation of blades 35 results in a more effective filtration system with longer periods between backwashing operations because the agitation caused by the tines 37 keeps the solids in suspension so that they do not agglomerate and blanket over the media. Backwashing time is also minimized, and lesser backwash water volume is required. In particular, the improved system of the present invention avoids unnecessary down time for maintenance in opening the tank and untimely replacement of the media.

When a selected differential pressure is reached between incoming and exiting fluid (e.g. from 10–15 p.s.i.g.), it is appropriate for the unit to be backwashed. The backwash water may be from a municipal water supply, recycled plant water, or other appropriate source, and is normally applied at around 30 p.s.i.g. in order not to wash out the media itself. In the backwash operation, the flow of fluid through vessel 20 is reversed, with the outgoing dirty fluid exiting through pipe 27 directed to a designated drain or collection sump.

It is to be appreciated that different versions of the invention may be made from different combinations of the various features described above. In particular, any number of pipes 29 with any number of elbow openings 31, 32 may be provided; that any suitable number of blades 35 may be provided, and that any suitable number of tines 37 may be provided on each blade 35. In addition, the curvature of blades 35 may range from none to substantial. Similarly, any suitable number of arms 51 may be provided, and any suitable number of exit nozzles 55 may be provided on each arm 51. The diameter and length of inlet and outlet pipes 27 and 28 may also be varied according to the expected fluid conditions and the size of vessel 20.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A fluid filtration system comprising:
   a. a vessel having a cylindrical side wall, and upper and lower end walls forming an interior chamber;
   b. filtration media disposed in said chamber such that there is an open space at the top thereof;
   c. an inlet in said upper end wall in fluid communication with a plurality of openings for introducing fluid under pressure into the open space of the chamber at an angle that is tangential to said cylindrical side wall and downwardly angled to induce a helical flow;
   d. a plurality of pivotally attached radially spaced apart axially-extending blades positioned in the open space below said openings such that the fluid flowing into the chamber from said openings comes into contact with said blades;
   e. at least one downwardly extending tine attached to each of said blades, said tine extending from said blade into an upper portion of said filtration media; and
   f. at least one outlet at the lower end of said chamber in communication with the exterior of said vessel, said outlet including a filtration screen.

2. The fluid filtration system of claim 1 wherein said outlet includes a plurality of hollow arms with each arm supporting at least one nozzle, and wherein each nozzle includes a detachable filtration screen.

3. The fluid filtration system of claim 1 wherein the length of each of said tines is the same.

4. The fluid filtration system of claim 1 wherein said tines are of differing lengths.

5. The fluid filtration system of claim 1 wherein each of said blades is straight.

6. The fluid filtration system of claim 1 wherein each of said blades has an arcuate shape.

7. The fluid filtration system of claim 1 wherein said inlet includes an axially oriented first pipe having a first end in fluid communication the exterior of said vessel, and an opposite end terminating into and in fluid communication with a second perpendicularly oriented pipe located inside said vessel, said second pipe extending across said chamber and having openings at opposite ends thereof.

8. The fluid filtration system of claim 7 wherein each of the end openings of said second pipe is bent at an angle that is tangential to said cylindrical wall.

9. The fluid filtration system of claim 8 wherein each of said end openings is angled slightly downwardly to induce a helical fluid flow inside said vessel.

* * * * *